United States Patent [19]

Motoori

[11] 4,310,230

[45] Jan. 12, 1982

[54] APPARATUS FOR PREVENTING MALFUNCTION OF AN ELECTRIC SHUTTER DEVICE

[75] Inventor: Ryuzo Motoori, Kawasaki, Japan

[73] Assignee: Nippon Kogaku K.K., Tokyo, Japan

[21] Appl. No.: 126,349

[22] Filed: Mar. 3, 1980

[30] Foreign Application Priority Data

Mar. 30, 1979 [JP] Japan .................... 54-40672[U]

[51] Int. Cl.³ .......................................... G03B 17/20
[52] U.S. Cl. ...................................... 354/50; 354/51; 354/238; 354/268; 354/60 L
[58] Field of Search .............. 354/50, 29, 30, 43, 354/51, 60 R, 60 L, 133, 146, 238, 258, 266, 268, 182, 186

[56] References Cited

U.S. PATENT DOCUMENTS

| 4,112,446 | 9/1978 | Numata | 354/50 |
| 4,181,417 | 1/1980 | Sugiura | 354/268 |
| 4,190,344 | 2/1980 | Ishiguro | 354/268 |

*Primary Examiner*—Lawrence R. Franklin
*Assistant Examiner*—S. D. Schreyer
*Attorney, Agent, or Firm*—Fitzpatrick, Cella, Harper & Scinto

[57] ABSTRACT

Apparatus for preventing a malfunction of an electric shutter device is disclosed which comprises a source voltage detection circuit and a demagnetizing device connected with the output terminal of the detection circuit. The source voltage detection circuit produces a signal at its output terminal when the detected voltage is below a certain determined value. The device connected with the output terminal of the detection circuit is responsive to the signal to demagnetize the magnet of the shutter device.

5 Claims, 4 Drawing Figures

APPARATUS FOR PREVENTING MALFUNCTION OF AN ELECTRIC SHUTTER DEVICE

BACKGROUND OF THE INVENTION

1. Field of the Invention

The present invention relates to an apparatus for preventing malfunction of an electric shutter device when a drop of source voltage occurs.

2. Description of the Prior Art

In an electric shutter device in which a magnet is used to finally transmit an operation from the electric circuit part to the mechanical part, it is known to bring the operation of the magnet into relation with the source voltage and to automatically determine whether photographing is possible or not depending upon whether the operation of the magnet is proper or not. Such a technique is disclosed, for example, in Japanese Patent Application Laid Open No. 16419/1974 the counterpart of which is U.S. Pat. No. 3,875,580 and Japanese Patent Application Laid Open No. 31322/1974 the counterpart of which is U.S. Pat. No. 3,829,873.

According to one embodiment of the known technique there is provided an armature having a certain preset reaction force against the attraction force of the magnet. When the source voltage drops somehow, the magnet fails to attract the armature because of the reduced attraction force of the magnet which can no longer overcome the preset reaction force of the armature. This failure in attraction is detected as an improper action of the magnet. The detection signal is used to prevent opening or closing of the shutter device. In other words, the prior art apparatus works with an electromagnet whose attraction level is directly related with the level of the source voltage. This system of preventing malfunction of an electric shutter device according to the prior art has some disadvantages and is poor in reliability.

For example, if the space between the magnet and armature is changed by dust occasionally put on the armature, then the attraction force of the magnet acting on the armature also may be changed. In this case, the normal value of source voltage predetermined as a threshold level for the aimed purpose can no longer function as designed. Another trouble takes place also in such case where the magnet is attracting the armature with the source voltage being at a level very close to the normal value. Since, in this case, the attraction force acting on the armature is very small, the armature may be moved away from the magnet by only a slightest impact accidentally applied thereto. As easily seen from these examples only, the malfunction preventing apparatus according to the prior art lacks reliability and needs improvements.

SUMMARY OF THE INVENTION

Therefore, the object of the present invention is to provide an improved apparatus for preventing malfunction of an electric shutter device which functions with high reliability and always with the designed value to prevent possible malfunction of the shutter when the source voltage drops.

Other and further objects, features and advantages of the invention will appear more fully from the following description taken in connection with the accompanying drawings.

DETAILED DESCRIPTION OF PREFERRED EMBODIMENTS

Figure 1:
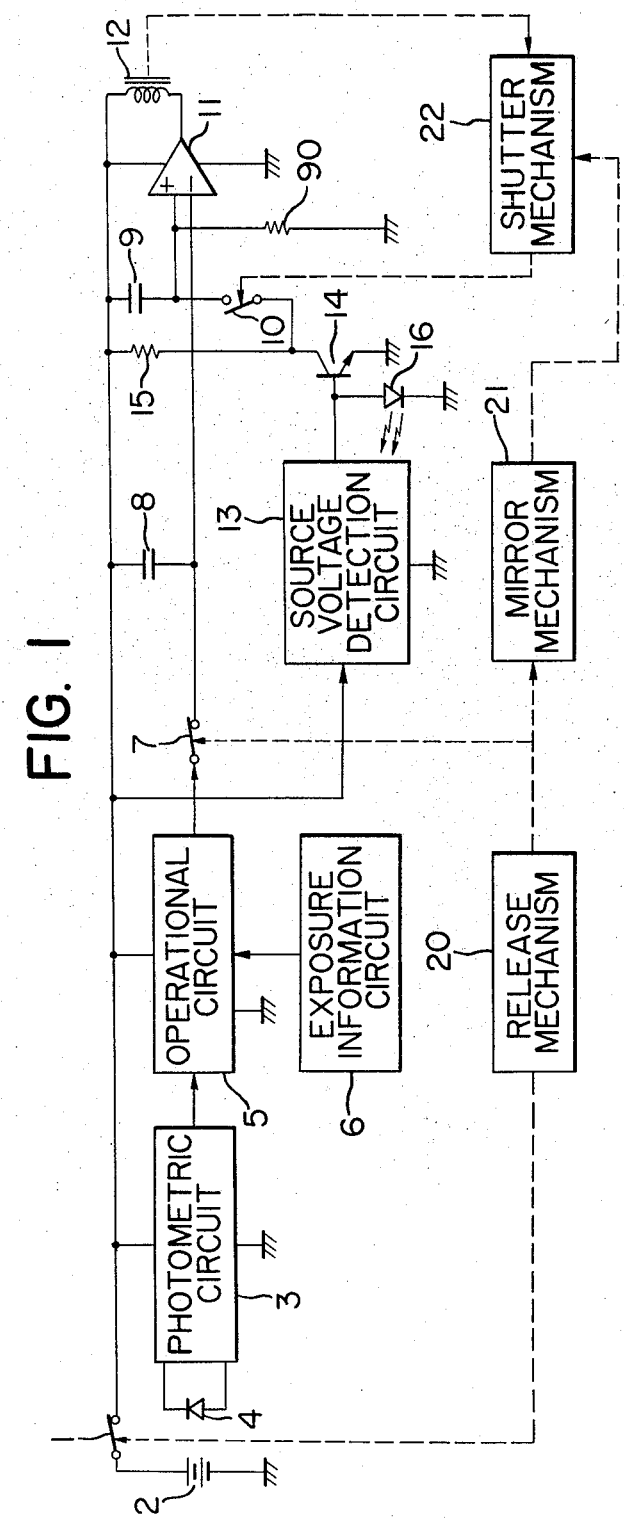
FIG. 1 shows an embodiment of the present invention.

In the embodiment shown in FIG. 1 the present invention is embodied in a single-lens reflex camera.

Designated by 20 is a release mechanism which is provided with a release button, not shown. By pushing the release button a power source switch 1 is closed to connect the circuit to a power source, that is, a battery 2. From the battery 2 an electric current is supplied to photometric circuit 3, operational circuit 5, etc. The photometric circuit 3 logarithmically suppresses the output from a photoelectric element 4 to make an output which is to be introduced into the operational circuit 5. To carry out operation, the operational circuit 5 receives also an output from the exposure information circuit 6 informing of exposure data such as film sensitivity and diaphragm value. To the output of the operational circuit 5 there is connected a memory capacitor 8 through a memory switch 7. Pressing the release button down further causes the release mechanism 20 to send a signal to a mirror mechanism 21. By means of the signal a mirror of the mirror mechanism 21 is moved upwards. At the same time, the memory switch 7 is opened. Therefore, the memory capacitor 8 holds the output voltage from the operational circuit 5 immediately before lifting the mirror. Upon the time of the upward movement of the mirror being completed, the front screen of the shutter mechanism 22 starts running. Simultaneously with the start of the front screen a start switch 10 is opened and charging of a time constant capacitor 9 through a resistor 90 is started. When the storage voltage at the memory capacitor 8 and the voltage value at the time constant capacitor 9 become coincident with each other, the output of a comparator circuit 11 is inverted so that the current flowing into the coil of a magnet 12 for holding the rear screen is cut off. Therefore, the shutter mechanism 22 allows the rear screen to start running.

If the voltage of the battery 2 lowers below the normal voltage level after closing of the source switch 1 and before opening of the start switch 10, then a battery voltage detection circuit 13 turns a transistor 14 conductive. Therefore, in this case, the time constant capacitor 9 is charged with a smaller time constant. Thus, when the charged voltage equal the voltage of the memory capacitor 8, the output of the comparator circuit 11 is inverted to cut off the magnet 12. Since the magnet 12 is demagnetized prior to the opening of the start switch 10, the shutter mechanism 22 holds the front screen in its position to prevent the shutter from opening in this case. In this position, therefore, the shutter can not be opened even when the operator pushes the release button down deeply, which the operator know the fact that the battery 2 is improper consumed. There is no fear of the film being exposed to light with an improver exposure. In this embodiment, the resistor 15 between the transistor 14 and the power source line has a smaller resistance than that of the coil of the magnet 12 to increase the consumption of current in the circuit when the current flowing to the coil of the magent 12 is cut off. Otherwise, the current consumed in the circuit may be decreased when the current supply to the magnet coil is cut off and thereby the voltage of the battery may rise up again which in turn will cause re-excitation of the magnet 12. Furthermore, in the embodiment shown in FIG. 1, there is provided a light emitting diode 16 which is driven by the output from the battery voltage detection circuit 13. The diode 16 serves to give the operator a visual notice of drop in source voltage. The light emitting diode 16 may be disposed, for example, in the view finder of the camera. Acoustic alarm means also may be used in place of the light emitting diode 16.

Figure 2:
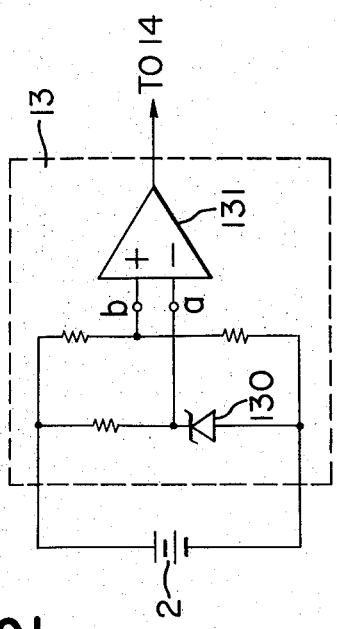
FIG. 2 is a detailed view of the block 13 shown in FIG. 1.

The battery voltage detection circuit 13 may be formed in a manner as shown in FIG. 2.

In FIG. 2 a Zener diode 130 applies to one input terminal (a) of the comparator circuit 131 a reference voltage which is independent of the voltage of the battery 2. To another input terminal (b) of the comparator circuit 131 is applied a voltage divided from the voltage of the battery 2, namely a voltage dependent on the voltage of the battery 2. The output (c) of the comparator circuit 131 is turned to high level when the voltage at the input terminal (b) becomes lower than that at the other input terminal (a). In this position of high level, the transistor 14 in FIG. 1 is rendered conductive. In the above embodiment, the power source switch 1 has been shown and described as a switch interlocked with the pushing motion of the release button. However, this switch 1 may be interlocked with the film winding lever of the camera.

Figure 3:
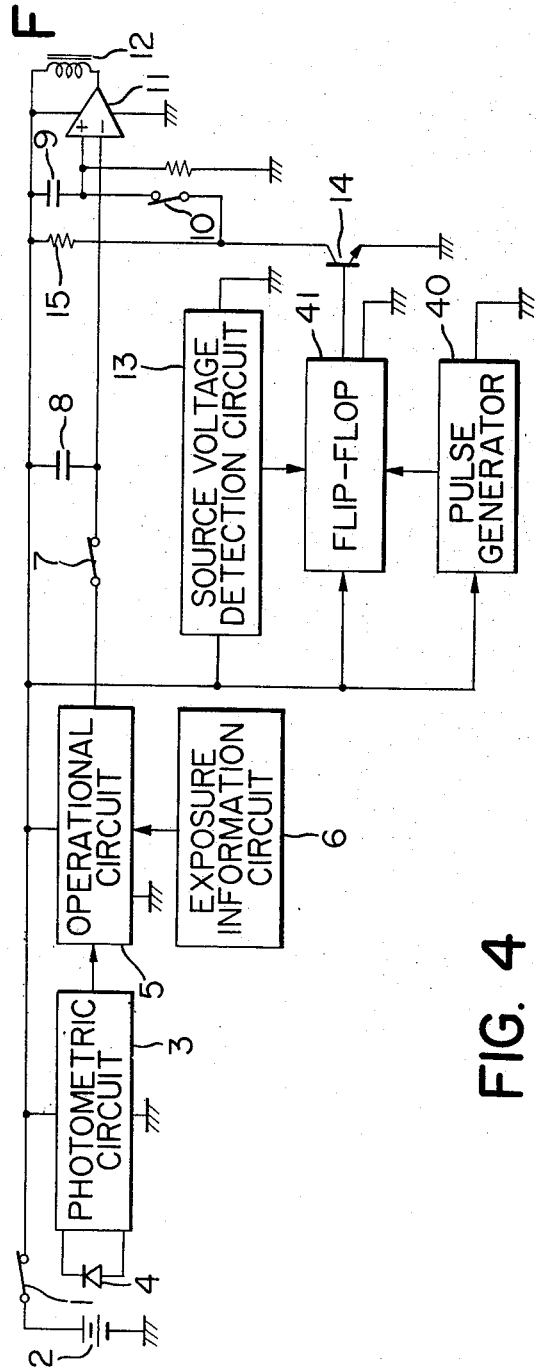
FIGS. 3 and 4 show other embodiments of the present invention respectively.

FIG. 3 shows a second embodiment of the invention which is different from the above described first embodiment only in the points that the second embodiment comprises a pulse generator 40 which issues a pulse when the source switch 1 is closed, and that the second embodiment comprises a flip-flop 41 which is set by high level of the output of the battery voltage detection circuit 13 and reset by the output pulse from the pulse generator 40. The transistor 14 is rendered conductive by setting of the flip-flop 41. This enables the flip-flop 41 to hold its set position even when the voltage of the battery 2 rises up as a result of cut-off of the current supply to the coil of the magnet 12 and the output of the battery voltage detection circuit 13 is turned to low level. Since the flip-flop 41 holds its set position, the magnet 12 remains deenergized. Arrangement and manner of operation of other parts of the second embodiment correspond to those of the first embodiment and need not be further described. As the pulse generator 40 there may be used any of known pulse generators.

Figure 4:
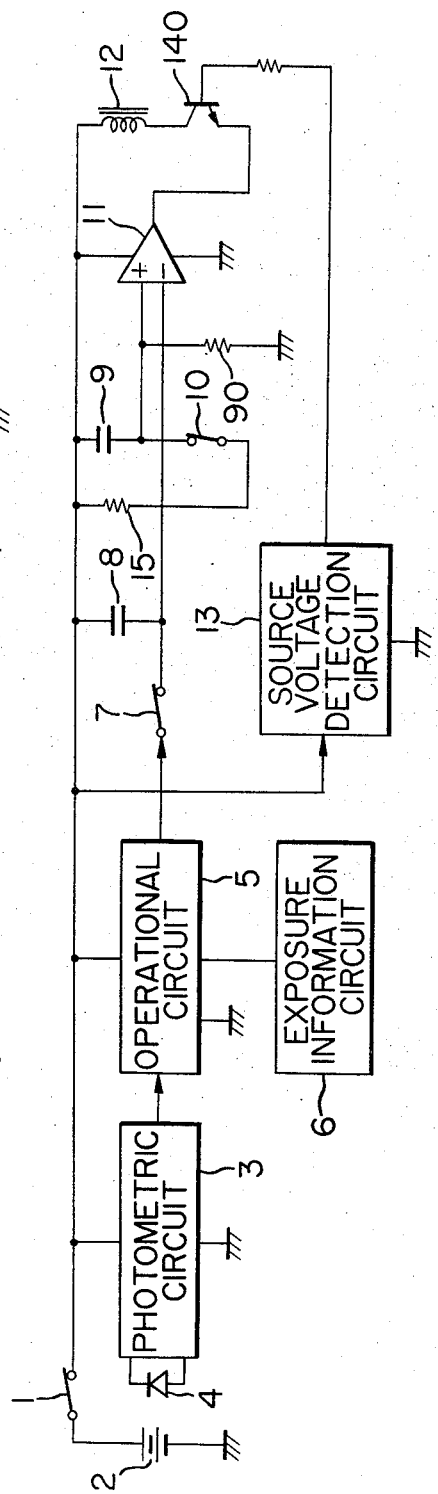

The embodiments shown in FIGS. 1 and 3 may be modified in a manner as shown in FIG. 4 substituting a transistor 140 for the above transistor 14.

In the modified circuit shown in FIG. 4, the transistor 140 is connected between the coil of the magnet 12 and the comparator circuit 11. Compared with the embodiments shown in FIGS. 1 and 3, the output level of the battery voltage detection circuit 13 is changed inversely so that the transistor 140 is rendered conductive when the voltage of the battery 2 is at a level above the normal value and is nonconductive when the voltage of the battery 2 is below the normal value. For example, if the circuit shown in FIG. 2 is used as the battery voltage detection circuit 13 in the modification, the connection of the input terminals of the comparator circuit 131 must be inverted.

As will be understood from the foregoing, according to the invention, the voltage of the battery 2 is detected by the battery voltage detection circuit 13 before the shutter being opened and if the detected battery voltage is at a level lower than the normal value predetermined therefor, the current supply to the magnet 12 is cut off. Therefore, the apparatus according to the invention prevents the shutter from opening and closing without failure. It is evident that apparatus for preventing malfunction of an electric shutter device according to the invention has a highly improved reliability.

While the present invention has been particularly shown and described with reference to preferred embodiments thereof, it will be understood by those skilled in the art that the foregoing and other changes in form and details can be made therein without departing from the spirit and scope of the invention.

I claim:

1. Apparatus for preventing malfunction of an electric shutter device having a magnet, a shutter control circuit to initiate shutter closing by demagnetizing said magnet after releasing the shutter and a shutter mechanism for preventing the shutter from opening or closing whenever the attraction force of said magnet lowers below a certain determined value before releasing the shutter, said apparatus comprising:

a source voltage detection circuit for detecting the source voltage and producing a signal at its output terminal when the detected source voltage is at a level lower than a certain determined value and means operatively connected to the output terminal of said source voltage detection circuit and being responsive to said signal to demagnetize said magnet, said means being related to said shutter control circuit in such manner that said circuit can demagnetize said magnet before releasing the shutter, said shutter control circuit comprising a timing circuit and demagnetizing said magnet when said timing circuit has completed counting a predetermined time after releasing the shutter; said means bringing the timing circuit into its counted-up position.

2. An apparatus as claimed in claim 1, wherein said timing circuit includes a capacitor; said means includes a switching transistor connected in series with said capacitor; and the output terminal of said source voltage detection circuit is connected to a base of said transistor so that the transistor may be turned on by the signal from said output terminal.

3. An apparatus as claimed in claim 2, wherein said means further includes means for preventing, by turning on said switching transistor, the source voltage from rising-up due to the demagnetization of the magnet.

4. Apparatus as claimed in claim 1 wherein said means is a switch connected with said magnet in series.

5. Apparatus as claimed in claim 1 wherein said apparatus further comprises alarm means connected to the output terminal of said source voltage detection circuit and being responsive to said signal to give an alarm.

* * * * *

UNITED STATES PATENT AND TRADEMARK OFFICE
CERTIFICATE OF CORRECTION

PATENT NO. : 4,310,230
DATED : January 12, 1982
INVENTOR(S) : RYUZO MOTOORI

It is certified that error appears in the above-identified patent and that said Letters Patent are hereby corrected as shown below:

Column 2, line 62, after "which" insert --lets--;
line 63, after "is" delete "improper";
line 65, "improver" should be --improper--.

Signed and Sealed this

Sixteenth Day of March 1982

[SEAL]

Attest:

GERALD J. MOSSINGHOFF

Attesting Officer

Commissioner of Patents and Trademarks